(12) United States Patent
Murarka et al.

(10) Patent No.: US 9,992,640 B2
(45) Date of Patent: Jun. 5, 2018

(54) SHORT-MESSAGE SERVICE VERIFICATION OF ACCOUNT INFORMATION

(75) Inventors: Neel Ishwar Murarka, Menlo Park, CA (US); Jacob Andrew Brill, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 1007 days.

(21) Appl. No.: 13/532,424

(22) Filed: Jun. 25, 2012

(65) Prior Publication Data
US 2013/0344904 A1    Dec. 26, 2013

(51) Int. Cl.
*H04W 4/14*    (2009.01)
*H04W 4/00*    (2018.01)

(52) U.S. Cl.
CPC .............. *H04W 4/14* (2013.01); *H04W 4/001* (2013.01)

(58) Field of Classification Search
CPC ......... H04W 4/12; H04W 4/14; H04W 12/06; H04W 12/12; H04W 4/001
USPC ......................................... 455/466, 410–411
See application file for complete search history.

(56) References Cited

U.S. PATENT DOCUMENTS

| | | | | |
|---|---|---|---|---|
| 2009/0279682 | A1* | 11/2009 | Strandell | H04L 63/18 379/201.02 |
| 2012/0246031 | A1* | 9/2012 | Sherwin | G06Q 20/12 705/26.82 |
| 2013/0185220 | A1* | 7/2013 | Good | G06Q 50/01 705/329 |

OTHER PUBLICATIONS

3G TS 23.040 V3.3.0 (Dec. 1999) 3$^{rd}$ Generation Project; Technical Specification Group Terminals; Technical realization of the Short Message Service (SMS).*

* cited by examiner

*Primary Examiner* — Marcos Torres
(74) *Attorney, Agent, or Firm* — Baker Botts L.L.P.

(57) ABSTRACT

In one embodiment, a method includes accessing one or more short-message service (SMS) messages received at the first mobile device from a server of a verification authority; automatically and without manual user input, processing by the application data in the SMS messages to detect a particular bit sequence; and automatically and without manual user input, transmitting the information of the first user to the verification authority from the first mobile device in response to detecting the particular bit sequence.

18 Claims, 5 Drawing Sheets

SHORT-MESSAGE SERVICE VERIFICATION OF ACCOUNT INFORMATION

TECHNICAL FIELD

This disclosure generally relates to mobile electronic devices.

BACKGROUND

A mobile electronic device, such as a smartphone, tablet device, laptop computer, etc., has general computing capabilities. The mobile electronic device may execute one or more applications such as for example, communications through short-message service (SMS), communications through multimedia-messaging service (MMS), accessing e-mail, accessing Internet content, communications through a short-range wireless (e.g. infrared or BLUETOOTH), business applications, gaming, or photography using a camera integrated into the mobile electronic device. A smartphone is a particular class of mobile electronic device with telephony capabilities provided through a radio-frequency (RF) communication link whilst moving within a geographic area. The smartphone may have a touch sensor integrated with a display screen, where the touch sensor detects touch inputs and the display screen displays content. The smartphone connects to a cellular network for access to the public telephone network and Internet content.

DESCRIPTION OF EXAMPLE EMBODIMENTS

Figure 1:
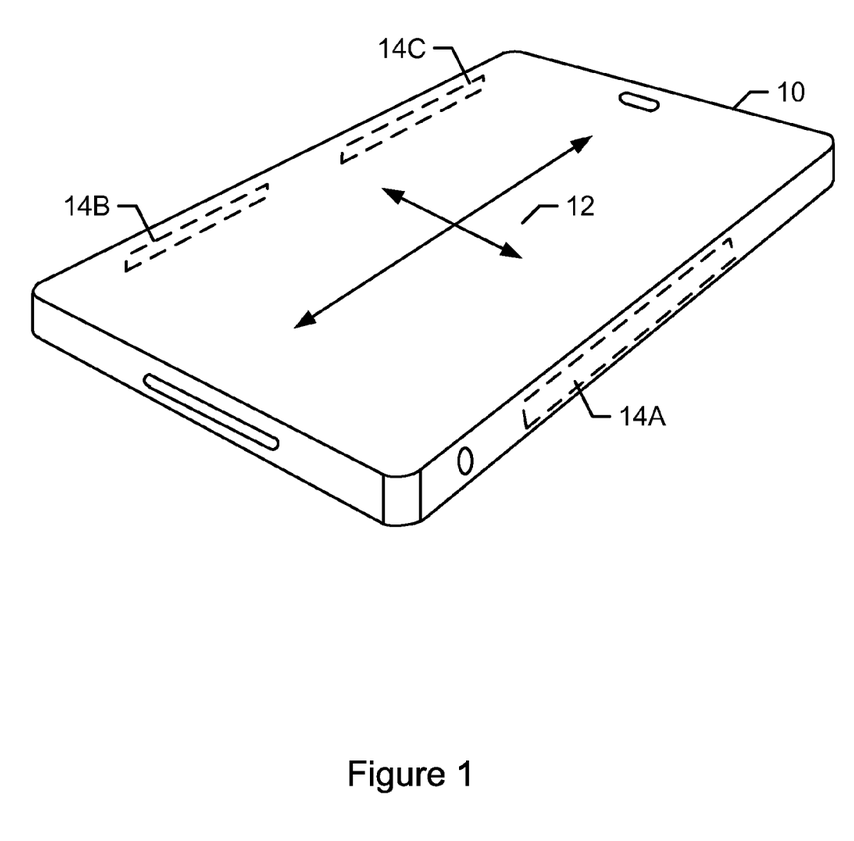
FIG. 1 illustrates an example mobile device.

FIG. 1 illustrates an example mobile device. This disclosure contemplates mobile device 10 taking any suitable physical form. As example and not by way of limitation, mobile device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 10 may have a touch screen 12 as an input component. In the example of FIG. 1, touch screen 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 1, one or more antennae 14A-B may be incorporated into one or more sides of mobile device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Figure 2:
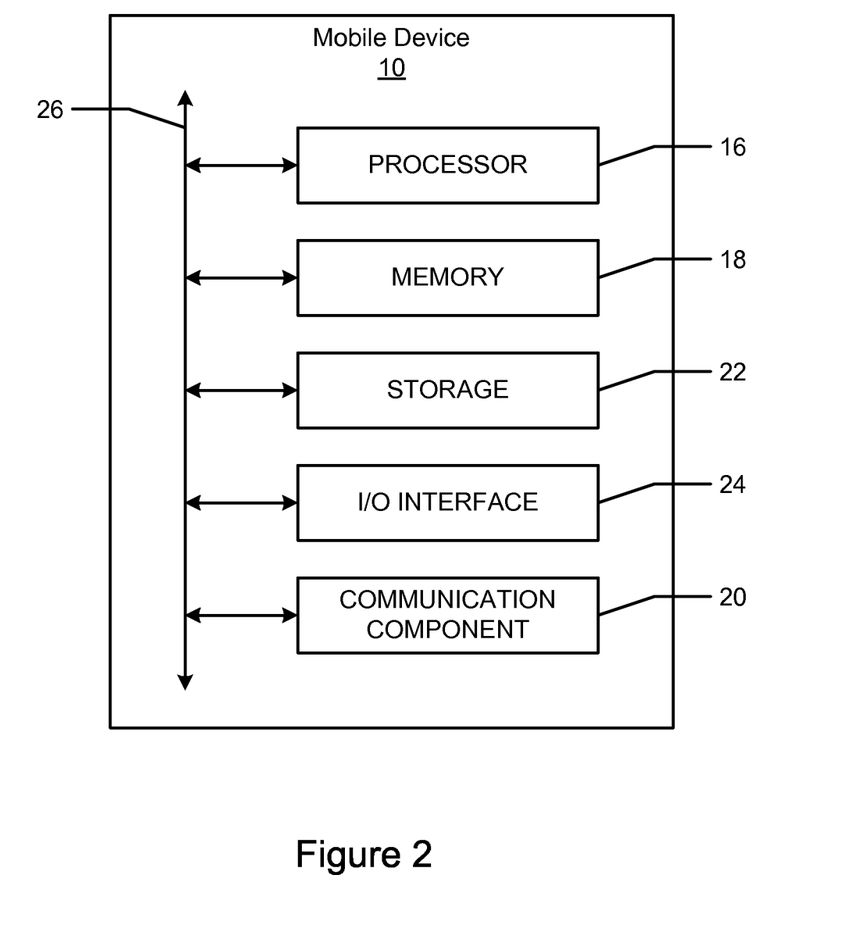
FIG. 2 illustrates example internal components of an example mobile device.

FIG. 2 illustrates example internal components of an example mobile device. Where appropriate, one or more mobile devices 10 may perform without substantial spatial or temporal limitation one or more steps of one or more methods described or illustrated herein. As an example and not by way of limitation, one or more mobile devices 10 may perform in real time or in batch mode one or more steps of one or more methods described or illustrated herein. In particular embodiments, one or more mobile devices 10 performs one or more steps of one or more methods described or illustrated herein. In particular embodiments, one or more mobile devices 10 provides functionality described or illustrated herein. In particular embodiments, software running on one or more mobile devices 10 performs one or more steps of one or more methods described or illustrated herein or provides functionality described or illustrated herein. Particular embodiments include one or more portions of one or more mobile devices 10.

In particular embodiments, mobile device 10 includes a processor 16, memory 18, storage 22, an input/output (I/O) interface 24, a communication component 20, and a bus 26. Although this disclosure describes and illustrates a particular mobile device having a particular number of particular components in a particular arrangement, this disclosure contemplates any suitable mobile device having any suitable number of any suitable components in any suitable arrangement. In particular embodiments, processor 16 includes hardware for executing instructions, such as those making up a computer program or application. As an example and not by way of limitation, to execute instructions, processor 16 may retrieve (or fetch) the instructions from an internal register, an internal cache, memory 18, or storage 22; decode and execute them; and then write one or more results to an internal register, an internal cache, memory 18, or storage 22.

In particular embodiments, processor 16 may include one or more internal caches for data, instructions, or addresses. This disclosure contemplates processor 16 including any suitable number of any suitable internal caches, where appropriate. As an example and not by way of limitation, processor 16 may include one or more instruction caches, one or more data caches, and one or more translation lookaside buffers (TLBs). Instructions in the instruction caches may be copies of instructions in memory 18 or storage 22, and the instruction caches may speed up retrieval of those instructions by processor 16. Data in the data caches may be copies of data in memory 18 or storage 22 for instructions executing at processor 16 to operate on; the results of previous instructions executed at processor 16 for access by subsequent instructions executing at processor 16 or for writing to memory 18 or storage 22; or other suitable data. The data caches may speed up read or write operations by processor 16. The TLBs may speed up virtual-address translation for processor 16. In particular embodiments, processor 16 may include one or more internal registers for data, instructions, or addresses. This disclosure contemplates a processor 16 including any suitable number of any suitable internal registers, where appropriate. Where appropriate, processor 16 may include one or more arithmetic logic units (ALUs); be a multi-core processor; or include one or more processors. Although this disclosure describes and illustrates a particular processor, this disclosure contemplates any suitable processor.

In particular embodiments, software executed by processor 16 may include an operating system (OS). The OS may include a kernel or any number of device drivers corresponding to one or more hardware components of mobile device 10. As an example and not by limitation, if mobile device 10 is a smartphone, then the OS may be a mobile operating system, such as for example, WINDOWS Phone, ANDROID, Symbian, IOS, or Bada. In particular embodiments, one or more software applications may be executed on mobile device 10. In particular embodiments, the applications may be native applications installed and residing on mobile device 10. As an example and not by way of limitation, an application (e.g. GOOGLE MAPS) may display a map on a touch screen, search for addresses and businesses, or provide directions to a geographic location; a second application may provide remote access to email; a third application (i.e. a web browser) may enable the device user to browse and search the Internet; a fourth application may control a camera to take photos or record videos; and a fifth application may allow the device user to receive and initiate voice-over Internet Protocol (VoIP) or cellular network calls. The software applications may have a user interface (UI) and may implement one or more specific functionalities. The software applications may include one or more software modules implementing the specific functionalities. The executable code of the software applications may be stored in memory 18 or storage 22 of mobile device 10.

In particular embodiments, memory 18 includes main memory for storing instructions for processor 16 to execute or data for processor 16 to operate on. As an example and not by way of limitation, mobile device 10 may load instructions from storage 22 or another source (such as, for example, another mobile device 10) to memory 18. Processor 16 may then load the instructions from memory 18 to an internal register or internal cache. To execute the instructions, processor 16 may retrieve the instructions from the internal register or internal cache and decode them. During or after execution of the instructions, processor 16 may write one or more results (which may be intermediate or final results) to the internal register or internal cache. Processor 16 may then write one or more of those results to memory 18. In particular embodiments, processor 16 executes only instructions in one or more internal registers or internal caches or in memory 18 (as opposed to storage 22 or elsewhere) and operates only on data in one or more internal registers or internal caches or in memory 18 (as opposed to storage 22 or elsewhere).

One or more memory buses (which may each include an address bus and a data bus) may couple processor 16 to memory 18. Bus 26 may include one or more memory buses, as described below. In particular embodiments, one or more memory management units (MMUs) reside between processor 16 and memory 18 and facilitate accesses to memory 18 requested by processor 16. In particular embodiments, memory 18 includes random-access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 18 may include one or more memories, where appropriate. Although this disclosure describes and illustrates particular memory, this disclosure contemplates any suitable memory.

In particular embodiments, storage 22 includes mass storage for data or instructions. As an example and not by way of limitation, storage 22 may include a hard-disk drive (HDD), a floppy disk drive, flash memory, or a combination of two or more of these. Storage 22 may include removable or non-removable (or fixed) media, where appropriate. Storage 22 may be internal or external to mobile device 10, where appropriate. In particular embodiments, storage 22 is non-volatile, solid-state memory. In particular embodiments, storage 22 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 22 taking any suitable physical form. Storage 22 may include one or more storage control units facilitating communication between processor 16 and storage 22, where appropriate. Where appropriate, storage 22 may include one or more storages 22. Although this disclosure describes and illustrates particular storage, this disclosure contemplates any suitable storage.

In particular embodiments, I/O interface 24 includes hardware, software, or both providing one or more interfaces for communication between mobile device 10 and one or more I/O devices. Mobile device 10 may include one or more of these I/O devices, where appropriate. One or more of these I/O devices may enable communication between a user and mobile device 10. As an example and not by way of limitation, an I/O device may include a keyboard, keypad, one or more sensors, touch screen, microphone, monitor, mouse, printer, scanner, speaker, digital still camera, stylus, trackball, video camera, another suitable I/O device or a combination of two or more of these. This disclosure contemplates any suitable I/O devices and any suitable I/O interfaces 24 for them. Where appropriate, I/O interface 24 may include one or more device or software drivers enabling processor 16 to drive one or more of these I/O devices. I/O interface 24 may include one or more I/O interfaces 24, where appropriate. Although this disclosure describes and illustrates a particular I/O interface, this disclosure contemplates any suitable I/O interface.

In particular embodiments, communication component 20 includes hardware, software, or both providing one or more interfaces for communication (such as, for example, packet-based communication) between mobile device 10 and one or more other mobile devices 10 or one or more networks. As an example and not by way of limitation, communication component 20 may include a network interface controller (NIC) or network adapter for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile device 10 may include any suitable communication component for any of these networks, where appropriate. Communication component 20 may include one or more communication components, where appropriate. Although this disclosure describes and illustrates a particular communication component, this disclosure contemplates any suitable communication component.

In particular embodiments, bus 26 includes hardware, software, or both coupling components of mobile device 10 to each other. As an example and not by way of limitation, bus 26 may include a graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a serial advanced technology attachment (SATA) bus, a Video Electronics Standards Association local (VLB) bus, or another suitable bus or a combination of two or more of these. Bus 26 may include one or more buses 26, where appropriate. Although this disclosure describes and illustrates a particular bus, this disclosure contemplates any suitable bus or interconnect.

Figure 3:
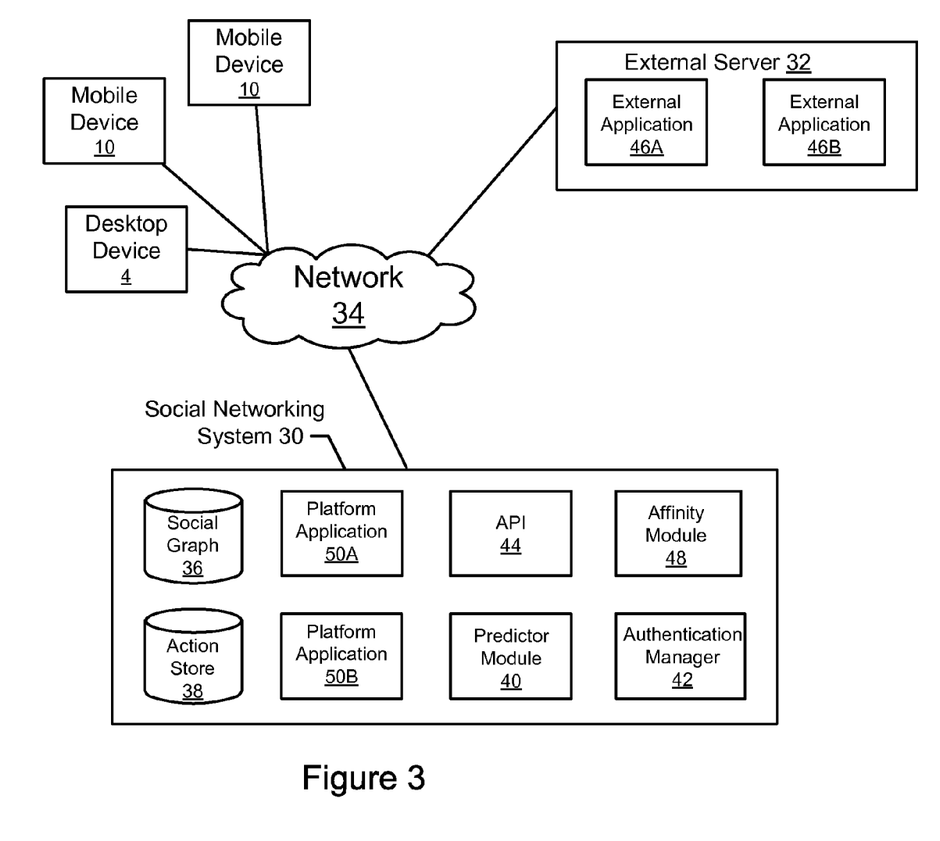
FIG. 3 illustrates an example social-networking system.

FIG. 3 illustrates an example social-networking system. In the example of FIG. 3, a social-networking system 30 and an external server 32 are coupled through a network 34. Network 34 generally represents a network or collection of networks (such as for example the Internet, a corporate intranet, a virtual private network (VPN), a LAN, a WLAN, a cellular network, a WAN, a MAN, or a combination of two or more such networks) over which social-networking system 30 or external server 32 may communicate with mobile devices 10A-C.

One or more users may interact with social-networking system 30 using mobile devices 10A-C. Mobile devices 10A-C may communicate with social-networking system 30 via an application such as a web browser or native application executed on processor of mobile devices 10A-C. In particular embodiments, one or more mobile devices 10A-C may be a smartphone, as described above. As an example and not by way of limitation, interactions between mobile devices 10A-C and social-networking system 30 may include viewing profiles of other users of social-networking system 30, contributing and interacting with media items, joining groups, listing and confirming attendance at events, checking in at locations, liking certain pages, creating pages, and performing other tasks that facilitate social interaction.

Social-networking system 30 includes components used to store information about users and objects represented in the social networking environment and relationships among the users and objects. The social-networking system 30 may include components enabling interactions to mobile devices 10A-C, as described below. Components of social-networking system 30 may be hosted on one or more servers. This disclosure contemplates any suitable servers, such as servers that are internal to social-networking system 30 or external servers 32. As an example and not by way of limitation, one or more servers may each include one or more advertising servers, applications servers, catalog servers, communications servers, database servers, exchange servers, fax servers, file servers, game servers, home servers, mail servers, message servers, news servers, name or domain-name servers (DNS), print servers, proxy servers, sound servers, standalone servers, web servers, or web-feed servers. In particular embodiments, a server includes hardware, software, or both for providing the functionality of the server. As an example and not by way of limitation, a server that operates as a web server may be capable of hosting websites containing web pages or elements of web pages and include appropriate hardware, software, or both for doing so. In particular embodiments, a web server may host Hyper Text Markup Language (HTML) or other suitable files or dynamically create or constitute files for web pages on request. In response to a Hyper Text Transfer Protocol (HTTP) or other request from mobile devices 10A-C, the web server may communicate one or more such files to mobile devices 10A-C. As another example, a server that operates as a database server may be capable of providing an interface for interacting with one or more data stores (such as, for example, action store 38 described below). Where appropriate, a server may include one or more servers; be unitary or distributed; span multiple locations; span multiple machines; span multiple datacenters; or reside in a cloud, which may include one or more cloud components in one or more networks.

A social graph 36 of social-networking system 30 stores the connections each user has with other users of social-networking system 30. In particular embodiments, social graph 36 may also store second-order connections. The connections may thus be direct or indirect. As an example and not by way of limitation, if user A is a first-order connection of user B but not of user C, and B is a first-order connection of C, then C is a second-order connection of A on social graph 36. An action store 38 stores actions that have been performed by the users of social-networking system 30, along with an indication of the time associated with those actions and references to any objects related to the actions. Action store 38 may store statistics for specified categories of actions. As an example and not by way of limitation, for a given user, action store 38 may contain a number of stories posted in 30 days by a user, a number of photos posted by the user in 30 days, or a number of distinct users that received comments of the user within the past 30 days. For a given connection between two users, user A and user B, action store 38 may contain actions such as the number of profile page views from user A to user B, the number of photo page views from user A to user B, and the number of times user A and user B were tagged in the same photo, and these actions may be associated with a timestamp or may be filtered by a cutoff (e.g., 24 hours, 90 days, etc.). The actions recorded in action store 38 may be farmed actions, which are performed by a user in response to the social-networking system 30 providing suggested choices of actions to the user.

A predictor module 40 is responsible for computing a set predictor functions that predict whether a user will perform a set of corresponding actions. Each predictor function may be representative of a user's interest in a particular action associated with the predictor function. The historical activity of a user may be used as a signal of a user's future interest in the same activity. In particular embodiments, the predictor function is generated using a machine-learned algorithm, that is trained using a user's historical activity associated with an action. Predictor module 40 thus provides a predictor function for each of a set of actions, where a predictor function may take as an input the user's historical activity and then outputs a measure of the likelihood that the user will engage in the corresponding activity.

An authentication manager 42 authenticates users on mobile devices 10A-C as being registered users of social-networking system 30. Authentication manager 42 may allow users to log into social-networking system 30 from mobile devices 10A-C through an application supporting social-networking system 30. An application programming interface (API) 44 works in conjunction with authentication manager 40 to validate users via external applications 46A-B stored on external server 32. In particular embodiments, authentication manager 42 in conjunction with API 44 may periodically verify account information of the user, as described below.

An affinity module 48 provides a measure of affinity based on input data about the user from the social-networking system 30 using the predictor functions. Various processes may request a measure of affinity from affinity module 48. As an example and not by way of limitation, the processes may include basic social-networking system 30 functionality, such as for example newsfeed algorithms, advertising-targeting algorithms, or friend suggestion algorithms. Other processes that request measures of affinity may be executed by one or more platform applications 50A-B, which are applications that operate within the social-networking system 30 but may be provided by third parties other than an operator of the social-networking system 30. Platform applications 50A-B may include social games, messaging services, or any suitable application that uses the social platform provided by social-networking system 30.

In particular embodiments, the processes requesting a measure of affinity for a user may include one or more external applications 46A-B executed on external server 32. External applications 46A-B may interact with the social-networking system 30 via API 44. External applications 46A-B can perform various operations supported by the API 44, such as enabling users to send each other messages or SMS messages through social-networking system 30 or showing advertisements routed through social-networking system 30. Herein, reference to SMS messages encompasses messages in text and other forms of content, such as for example, images or links to web content.

In particular embodiments, a verification authority may verify information of the user. As an example and not by way of limitation, the user performs the registration procedure for an account on social-networking system 30. As part of the registration procedure, the user may provide particular information associated with the user. As an example and not by way of limitation, the user may provide a telephone number of a mobile device 10A (e.g. smartphone) to social-networking system 30. As another example, the user may provide an e-mail address when registering for an account on social-networking system 30. In particular embodiments, authentication manager 42 in conjunction with one or more external applications 46A-B or platform applications 50A-B may verify the information provided by the user through a wireless protocol. As an example an not by way of limitation, social-networking system 30 may send a SMS message to the telephone number of mobile device 10A and then wait for the user to respond to the SMS with a passcode before completing the user's registration. As another example, social-networking system 30 may send an e-mail to the e-mail address of the user and then wait for the user to respond to the e-mail with a passcode before completing the user's registration. Herein, reference to a verification authority encompasses any suitable user verification or authentication component of any suitable Internet entity providing a service to the user such as for example a social-networking system, a financial institution, or a web portal. Although this disclosure describes verification of user information by a particular verification authority, this disclosure contemplates verification of information of the user by any suitable verification authority.

A verification authority may periodically verify information provided by the user. In particular embodiments, the periodic verification may be performed through wireless communication between mobile device 10A and social-networking system 30 or one or more applications 46A-B and 50A-B associated with social-networking system 30. As an example and not by way of limitation, social-networking system 30 or one or more platform applications 50A-B or external applications 46A-B may periodically send SMS messages to the telephone number of mobile device 10A of the user to determine on an on-going basis whether the telephone number is still valid for the user. As another example, the application on mobile device 10A may periodically transmit SMS messages to verify the validity of the phone number on an on-going basis. In particular embodiments, the OS of mobile device 10A may give an application supporting social-networking system 30 and executed by mobile device 10A access to SMS messages received by the mobile device 10A. The application on mobile device 10A supporting social-networking system 30 may automatically and without manual input from the user process the SMS message from social-networking system 30. The SMS message may include data that initiates an information verification procedure performed by the application as described below. As an example and not by way of limitation, the application may process the SMS message to extract a query for information of the user, as described below. As another example, the application may process the SMS message to detect a particular bit sequence. Although this disclosure describes particular data included in particular communications from a particular verification authority, this disclosure contemplates initiation of verification of information of the user through any suitable data included in any suitable communication from any suitable verification authority. Furthermore, while this disclosure describes validation of a user through SMS messages, this disclosure contemplates validation of the user through any suitable wireless communication method, such as for example MMS messages, instant messaging, or e-mail.

In response to the query from social-networking system 30, the application may automatically and without manual input from the user access the information of the user and transmit a SMS message to authentication manager 42 of social-networking system 30 with information confirming the information of the user. As an example and not by way of limitation, the application may access the telephone number associated with mobile device 10A and may transmit a responding SMS message to social-networking system 30 with information confirming the telephone number of mobile device 10A remains valid. As another example, the application may detect the particular bit sequence included in the SMS message and may transmit a responding SMS message to social-networking system 30 based on detection of the particular bit sequence. In particular embodiments, the social-networking system may update the state of the user based on receiving verification of the information of the user. Although this disclosure describes the responding message transmitted by the application as being the same wireless communication method as the incoming message from the verification authority, this disclosure contemplates transmitting the responding message through a wireless communication method that is different than the incoming message from the verification authority. Furthermore, while this disclosure describes validation of a user through particular information of the user, this disclosure contemplates validation of the user through any suitable information of the user stored on the mobile device, such as for example, a password, serial number of the mobile device, or a digital certificate.

In particular embodiments, the verification authority may verify information through one or more designated "guardian" users who facilitate validation of the user. As an example and not by way of limitation, the user may designate one or more "guardian" users to social-networking system 30 to facilitate validation of the user. Authentication manager 42, functioning as the verification authority of social-networking system 30, may transmit a SMS message to mobile device 10B-C of one or more guardian users designated by the user. As described above, the application supporting social-networking system 30 may automatically and without manual input of a user mobile devices 10B-C process the SMS message from social-networking system 30 to extract a query for information of the user to be validated. As an example and not by way of limitation, the application may search SMS messages stored on mobile devices 10B-C of the guardian users to locate a SMS message from mobile device 10A of the user. The application extracts the information of the user (e.g. telephone number) from the SMS stored in mobile device 10B-C of the guardian users and transmits a SMS message to authentication manager 42 of social-networking system 30 with information confirming the telephone number associated with mobile device 10A remains valid.

Figure 4:
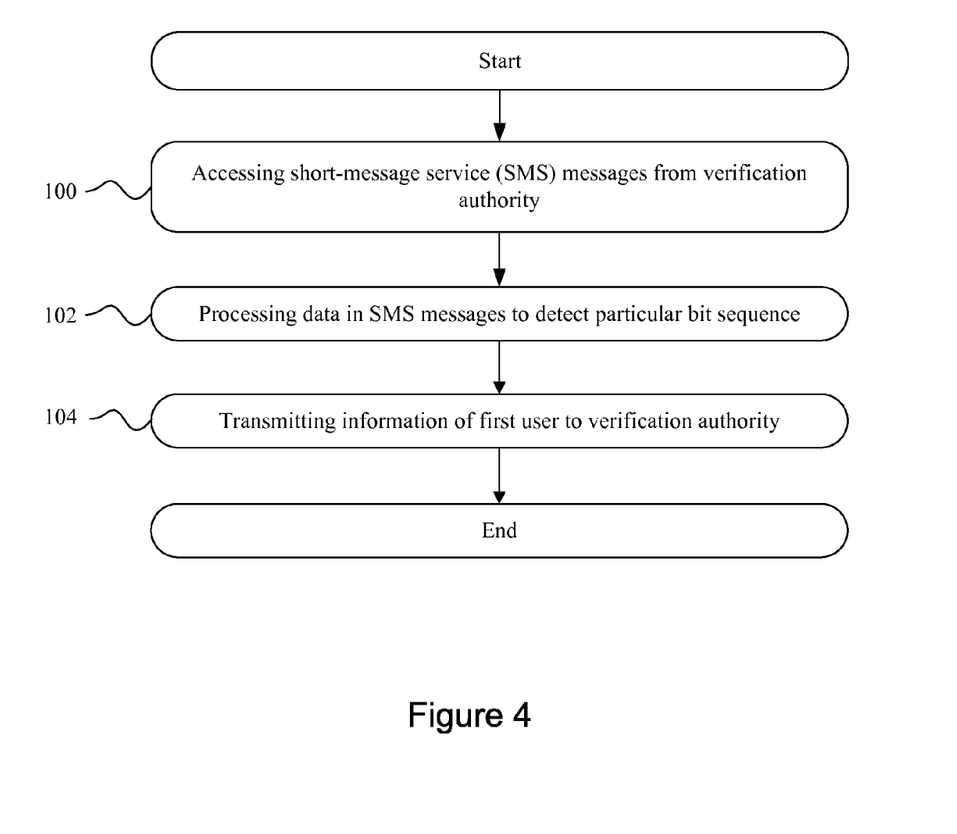
FIG. 4 illustrates an example method for automated verification of user information by an application on a mobile device.

FIG. 4 illustrates an example method for automated verification of user information through an application on a mobile device. The method may start at step 100, where one or more short-message service (SMS) messages are accessed by an application on the first mobile device. The SMS messages are received at the first mobile device from a server of a verification authority. At step 102, the application automatically and without manual user input, processes data in the SMS messages to extract a query for information associated with a first user. At step 104, the application automatically and without manual user input, transmits the information associated with the first user, at which point the method may end. In particular embodiments, the first mobile device is a smartphone and the information associated with the first user is a telephone number of the smartphone. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Figure 5:
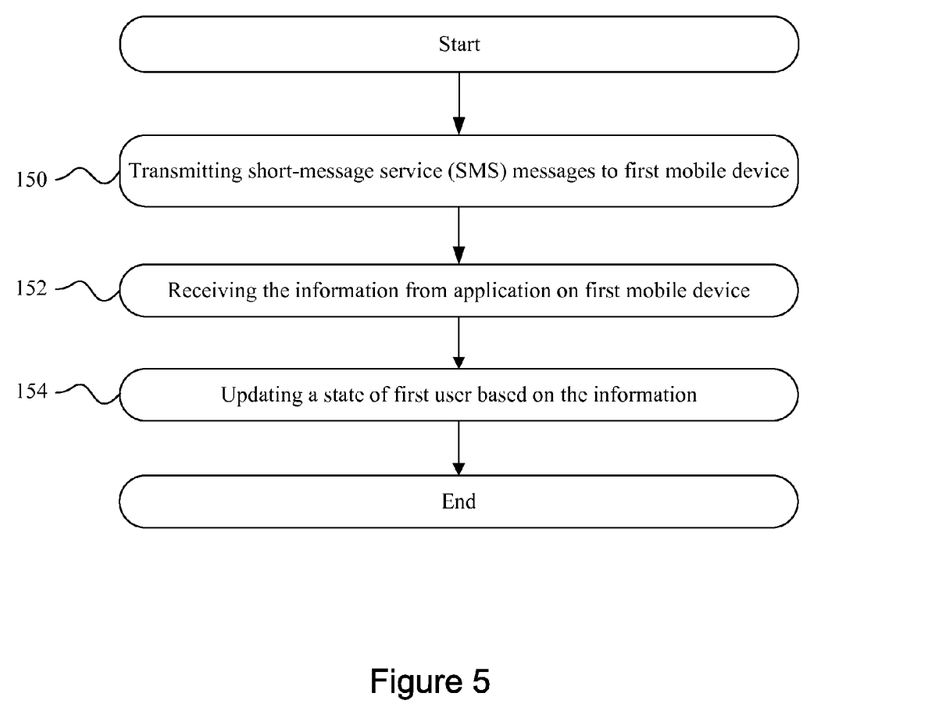
FIG. 5 illustrates an example method for automated verification of user information by a server.

FIG. 5 illustrates an example method for automated verification of user information by a server. The method may start at step 150, where one or more short-message service (SMS) messages are transmitted by a server of a verification authority to the first mobile device. The SMS messages include a query for information associated with a first user. At step 152, information associated with the first user is received from an application on the first mobile device. The application having automatically and without manual user input, processed data in the SMS messages and transmitted the information associated with the first user. At step 154, the state of the first user is updated based on the information associated with the first user, at which point the method may end. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. One or more computer-readable non-transitory storage media embodying logic configured when executed to:
   transmit one or more short-message service (SMS) messages to a first mobile device of a first user of a social-networking system, the SMS messages comprising a particular bit sequence, wherein the particular bit sequence represents a request for authentication information of the first user, the social-networking system facilitating interaction among users, including the first user and a plurality of second users that are each connected to the first user on an online social network, wherein one or more second users from the plurality are predetermined by the first user as designated guardian users for the validation of the first user;

receive authentication information of the first user from an application on the first mobile device, the application, automatically and without manual user input, having detected the particular bit sequence in the SMS messages and transmitted the authentication information in response to the detection of the particular bit sequence, wherein the authentication information was previously provided by the first user to the social-networking system; and update a state of the first user based on the authentication information, wherein updating the state of the first user enables the first user to interact with other users, including the second users, entities, events and content of the social-networking system.

2. The media of claim 1, wherein the logic is further configured to periodically transmit SMS messages to the first mobile device.

3. The media of claim 1, wherein the logic is further configured to receive authentication information of the first user through SMS messages transmitted to one or more second mobile devices of respective one or more second users that are predetermined by the first user as designated guardian users.

4. The media of claim 1, wherein the logic is further configured to receive, from the first user, a phone number, email address, or instant messaging username of the first user for wireless communication between the first mobile device and the social-networking system.

5. The media of claim 1, wherein the logic is further configured to:
transmit an SMS message to the first mobile device requesting a passcode; and
receive the passcode and the authentication information of the first user from the first mobile device.

6. The media of claim 1, wherein the first mobile device is a smartphone, and the authentication information is a phone number of the smartphone.

7. A method comprising:
by a server of a verification authority of a social-networking system, transmitting one or more short-message service (SMS) messages to a first mobile device of a first user, the SMS messages comprising a particular bit sequence, wherein the particular bit sequence represents a request for authentication information of the first user, the social-networking system facilitating interaction among users, including the first user and a plurality of second users that are each connected to the first user on an online social network, wherein one or more second users from the plurality are predetermined by the first user as designated guardian users for the validation of the first user;
by the server of the verification authority of the social-networking system, receiving authentication information from an application on the first mobile device, the application, automatically and without manual user input, having detected the particular bit sequence in the SMS messages and transmitted the authentication information in response to the detection of the particular bit sequence, wherein the authentication information was previously provided by the first user to the social-networking system; and
by the server of the verification authority of the social-networking system, updating a state of the first user based on the authentication information,
wherein updating the state of the first user by the verification authority of the social-networking system enables the first user to interact with other users, including the second users, entities, events and content of the social-networking system.

8. The method of claim 7, wherein the SMS messages are periodically transmitted to the first mobile device.

9. The method of claim 7, wherein the authentication information of the first user is further received through SMS messages transmitted to one or more second mobile devices of respective one or more second users that are predetermined by the first user as designated guardian users.

10. The method of claim 7, further comprising receiving, from the first user, a phone number, email address, or instant messaging username of the first user for wireless communication between the first mobile device and the verification authority.

11. The method of claim 7, further comprising:
transmitting an SMS message to the first mobile device requesting a passcode; and
receiving the passcode and the authentication information of the first user from the first mobile device.

12. The method of claim 7, wherein the first mobile device is a smartphone, and the authentication information is a phone number of the smartphone.

13. A system comprising:
a storage configured to store information of one or more users;
one or more servers coupled to the storage;
one or more computer-readable non-transitory storage media coupled to at least one of the servers and embodying logic configured when executed to:
transmit one or more short-message service (SMS) messages to a first mobile device of a first user of a social-networking system, the SMS messages comprising a particular bit sequence, wherein the particular bit sequence represents a request for authentication information of the first user;
receive authentication information of the first user from an application on the first mobile device, the application, automatically and without manual user input, having detected the particular bit sequence in the SMS messages and transmitted the authentication information in response to the detection of the particular bit sequence, wherein the authentication information was previously provided by the particular user to the social-networking system, the social-networking system facilitating interaction among users, including the first user and a plurality of second users that are each connected to the first user on an online social network, wherein one or more second users from the plurality are predetermined by the first user as designated guardian users for the validation of the first user; and
update a state of the first user based on the authentication information,
wherein updating the state of the first user enables the first user to interact with other users, including the second users, entities, events and content of the social-networking system.

14. The system of claim 13, wherein the logic is further configured to receive authentication information of the first user through SMS messages transmitted to one or more second mobile devices of respective one or more second users that are predetermined by the first user as designated guardian users.

15. The system of claim 13, wherein the logic is further configured to periodically transmit SMS messages to the first mobile device.

16. The system of claim 13, wherein the logic is further configured to receive, from the first user, a phone number, email address, or instant messaging username of the first user for wireless communication between the first mobile device and the social-networking system.

17. The system of claim 13, wherein the logic is further configured to:
transmit an SMS message to the first mobile device requesting a passcode; and
receive the passcode and the authentication information of the first user from the first mobile device.

18. The system of claim 13, wherein the first mobile device is a smartphone, and the authentication information is a phone number of the smartphone.

* * * * *